United States Patent [19]
Häusler et al.

[11] Patent Number: 5,691,784
[45] Date of Patent: Nov. 25, 1997

[54] APPARATUS FOR THE PROJECTION OF FRINGE-LIKE LIGHT PATTERNS

[76] Inventors: Gerd Häusler, Alterlanger Str. 33, D-97056 Erlangen; Ralf Lampalzer, Hirschenrangen 46, D-90607 Rueckersdorf, both of Germany

[21] Appl. No.: 355,291

[22] Filed: Dec. 12, 1994

[30]  Foreign Application Priority Data

Dec. 15, 1993 [DE] Germany .................. 43 42 830.4

[51] Int. Cl.$^6$ .................. G02F 1/13; G02F 1/1343; G01B 11/24
[52] U.S. Cl. .................. 349/1; 349/57; 349/110; 349/142; 356/376
[58] Field of Search .................. 359/36, 40, 67; 356/376; 349/1, 57, 139, 142, 110, 193, 201, 61, 5

[56]  References Cited

U.S. PATENT DOCUMENTS

| | | | |
|---|---|---|---|
| 3,727,527 | 4/1973 | Borowski et al. | 359/87 |
| 5,039,210 | 8/1991 | Welstead et al. | 349/1 |
| 5,175,601 | 12/1992 | Fitts | 356/376 |
| 5,339,154 | 8/1994 | Gassler et al. | 356/376 |
| 5,372,502 | 12/1994 | Massen et al. | 433/215 |
| 5,581,352 | 12/1996 | Zeien | 356/376 |

FOREIGN PATENT DOCUMENTS 4238581  5/1993  Germany .................. 359/73

*Primary Examiner*—William L. Sikes
*Assistant Examiner*—Tai V. Duong
*Attorney, Agent, or Firm*—Herbert L. Lerner; Laurence A. Greenberg; Werner H. Stemer

[57]  ABSTRACT

An apparatus for the generation of different given fringe-like light patterns in space is disclosed. The light patterns are predominantly used in optical metrology, for the three-dimensional acquisition of the shape of objects. Said light patterns are generated by astigmatic projection of a specially designed mask with sub-areas, the brightness of said sub-areas can be controlled, for example by implementing the mask as a liquid crystal light valve. The sub-areas are controlled in a way that by combination of bright and dark sub-areas, different sub-masks are formed. The astigmatic projection of any sub-mask generates one of the given fringe-like light patterns. In spite of the binary transparency of the sub-masks, continuously varying brightness can be achieved. All necessary sub-areas are located on the same area, interlaced such as in a mosaic work. On this area, any of the required sub-masks can be generated.

9 Claims, 4 Drawing Sheets

APPARATUS FOR THE PROJECTION OF FRINGE-LIKE LIGHT PATTERNS

FIELD OF THE INVENTION

An apparatus is described, for the generation of fringelike light patterns in three-dimensional space. The fringe patterns can be generated with high geometrical accuracy as well as with high accuracy of the illumination. The illumination can be high. The fringe patterns can be quickly exchanged.

Patterns of this kind are predominantly used in devices to measure the shape of surfaces. The fringe patterns are projected onto the sample under an angle of illumination, and are obsered under a different angle of observation (triangulation). The shape of the sample can be evaluated from the local shift of the observed patterns. In general, for this purpose several different fringe patterns are to be projected and to be observed.

BACKGROUND OF THE INVENTION

The invention described herein relates to the generation of fringelike light patterns, such as they are used to measure the shape of surfaces. The evaluation of the shape from those fringe patterns is described, for example, in the paper by M. Halioua, H. Liu, and V. Srinivasan (Automated phase measuring profilometry of 3D diffuse objects), Appl. Opt. 23 (1984) pp. 3105–3108.

There are known a couple of apparatuses to project fringe patterns for profilometry. In a brochure of the company ABW, Automatisierung Bildverarbeitung Dr. Wolf, Strogäustrasse 5, 7305 Neuhausen an der Fulda, Germany, "Linienprojektor Typ LCD 320", a projector is described that works by aid of a liquid crystal modulator. The liquid crystal modulator, has stripe shaped electrodes. The stripes are narrow and long and can be adressed separately. By suitable control of the electrodes it is possible to assemble any given fringelike transparency. This transparency is projected by a spherical lens onto the sample and generates there a fringe pattern. A disadvantage of this method is that liquid crystal masks can display only a few grey levels. Freuquently, only binary grey levels (transparent or opaque) are used. The generation of accurate grey levels would be highly desirable because the accuracy of the shape measurement directly related on the accuracy of those grey levels. Moreover, the total number of electrodes is limited, hence the transparency displays a spatial quantisation. This quantisation as well diminishes the achievable shape accuracy.

Reference is made to the inventor's own work, to overcome these problems, as described in the paper by M. Gruber and G. Häusler, "Simple, robust and accurate phase-measuring triangulation", Optik 89, 3 (1992) pp 118–122. The principle is sketched in FIG. 1: a binary mask (1) consisting of four sub-masks (1a) (1b) (1c) (1d) is projected onto the object, by means of a cylindric lens. No spherical lens is used. Thus, imaging (focusing) will occur only in y-direction (3). The image of each mask point is a line in x-direction (4). As a consequence, the projected light pattern (5) displays stripes in x-direction. The illumination along the x-direction is constant. The illumination along the y-direction (5) is proportional to the transparent fraction of the mask along the x-direction (4) at the considered locus y.

By means of this astgmatic projection, precise patterns with continuous grey levels can be generated by binary (black and white) masks.

The problem how to project different sub-masks in temporal sequence, is solved by Gruber and Häusler as follows: the different sub-masks (1a–1d), as shown in the example of are placed side by side on one single mask (1). The astigmatic image of each sub-mask corresponds to the desired light pattern (5). By means of a stop (9) that can be shifted in x-direction (4), the desired sub-mask will be activated at a desired time, as displayed in FIG. 1. This solution exhibits the following disadvantages: First, The stop activates only one sub-mask at one time. Hence a major fraction of the achievable illumination is lost. Second, the sub-masks are at different locations in the field. Hence, the influence of unavoidable aberrations is different for the different sub-masks, thus reducing the achievable measuring accuracy. Third, a mechanical shift of the stop is necessary.

BRIEF DISCLOSURE

The preferred embodiment of the invention utilises a specifically designed mask with different sub-areas. The mask is projected in an astigmatic way, to generate desired fringe-like light patterns. For that purpose, the transparency of the sub-areas can be controlled separately, such that different combinations of the sub-areas generate the desired different binary masks. An object of the invention is to avoid the stop that deduces light efficiency, and to avoid mechanical shift.

DETAILED DESCRIPTION

Figure 2:
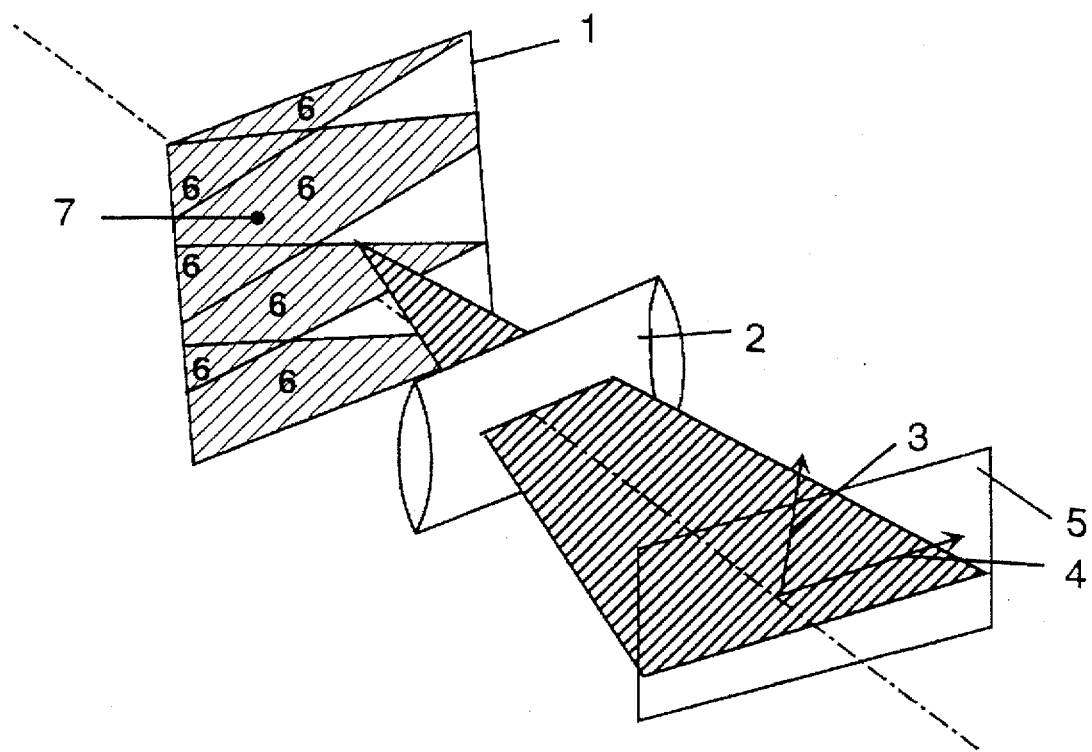
FIG. 2 illustrates the use of a mask with arbitrary sub-areas. The transparency of said subareas can be controlled separately.

The said disadvantages are eliminated by the present invention (FIG. 2): A mask (10) will be used, consisting of different sub-areas (6). The transparency of said sub-areas can be controlled separately, in general. These sub-areas are shaped and arranged in a way such that each of the desired light patterns can be generated by combination of transparent and opaque sub-areas.

Figure 1:
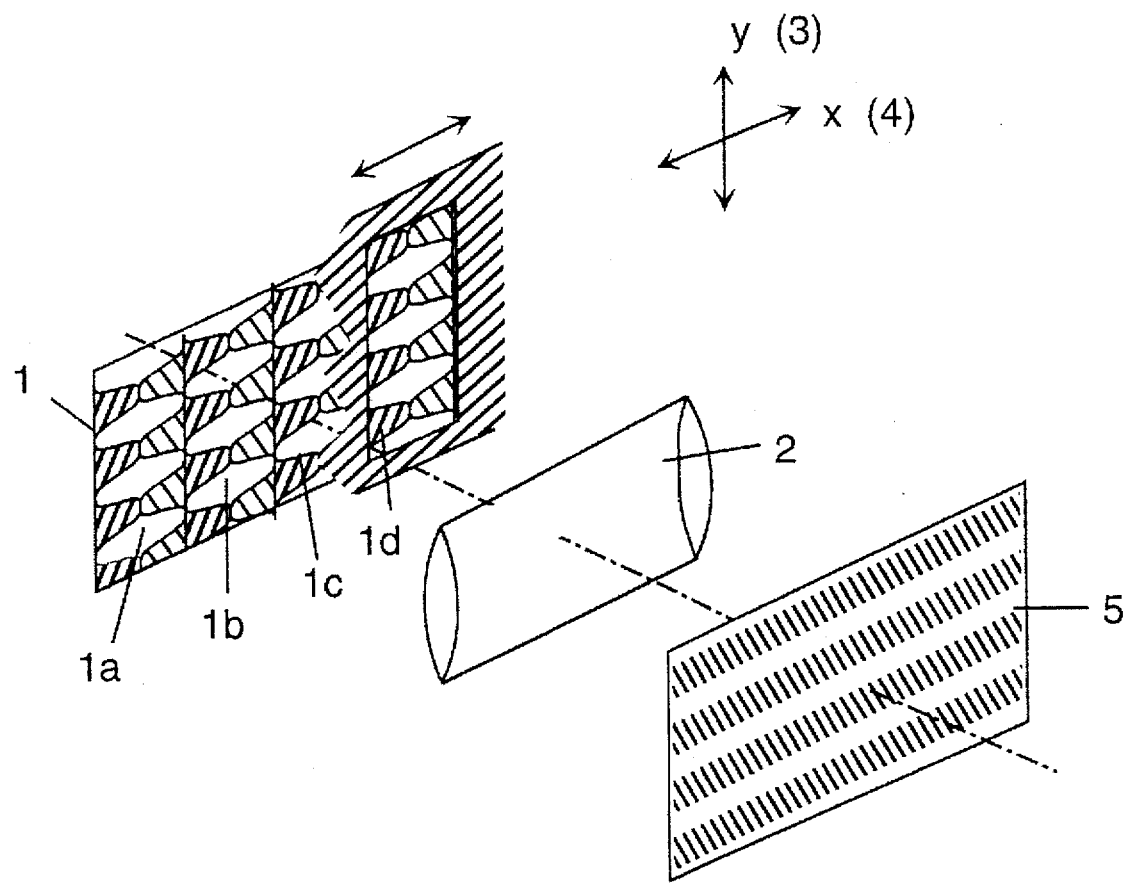
FIG. 1 illustrates the principle of astigmatic projection of a binary mask to generate light patterns with different grey levels. To generate different light patterns a stop is shifted in x-direction to open different sub-masks.

The basic principle of combination of sub-areas will be explained at one example: Two sinusoidal light patterns are to be generated, one shifted against the other. Other light patterns, the number of which is not limited to two, can be implemented by the same principle. The sub-areas are arranged such as a mosaic-work and shaped such that some of them can be repeatedly utilized for the generation of different light patterns. Hence, all sub-masks can be located at the same area of the mask, in contrast to the solution of FIG. 1, where each sub-mask requires extra space.

The light efficiency is increased, in case of N desired light patterns, the ligth efficiency is increased N times. Aberrations affect each sub-mask in the same way.

To achieve a desired light pattern, only one condition has to be satisfied: the fraction of the transparent part of the mask along the x-direction has to be a certain value, given by the desired local distribution of the illumination $I_k(y)$. The index k denotes the number of the desired light pattern.

This condition can be satisfied by different sub-area patterns. As an example we describe one method to configure the sub-areas: the graphs of all $I_k(y)$ are plotted together, in one single diagram, as shown in FIG. 3.

Figure 3:
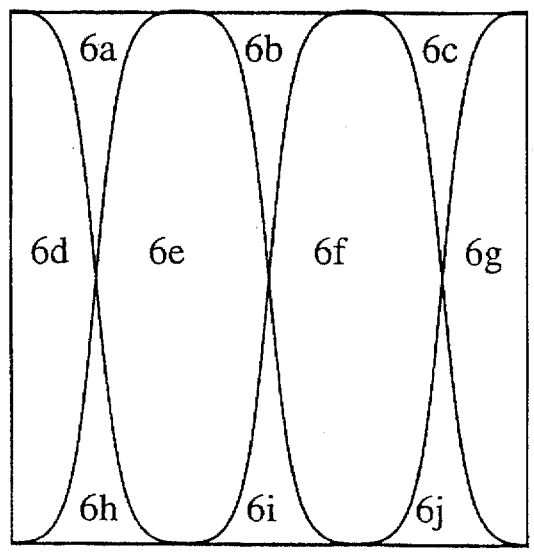
FIG. 3 displays an example of a mask and its sub-areas. This mask can generate two sinusoidal fringe patterns that are shifted against each other.

The graphs become the boundaries of different sub-areas 6a–6b as shown in FIG. 3. The sub-areas correspond to areas at the mask that can be controlled to be transparent or opaque. For example, the sub-areas can be implemented as electrodes of a liquid crystal device.

Figure 4:
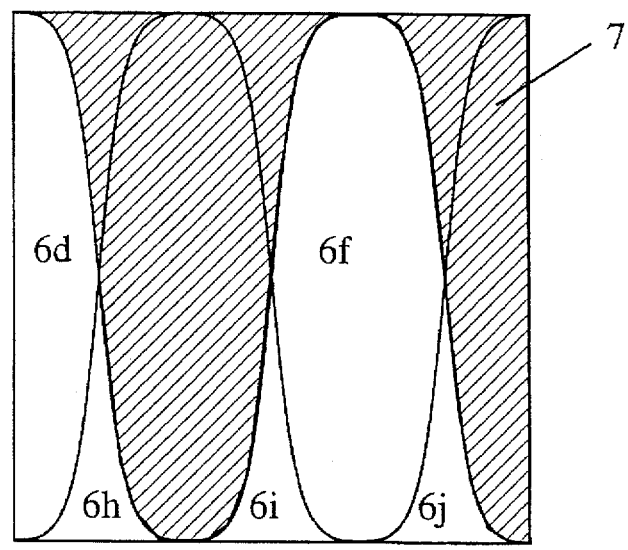
FIGS. 4,5 demonstrates two transparencies that can be generated by proper control of the sub-areas of the mask.
Figure 5:
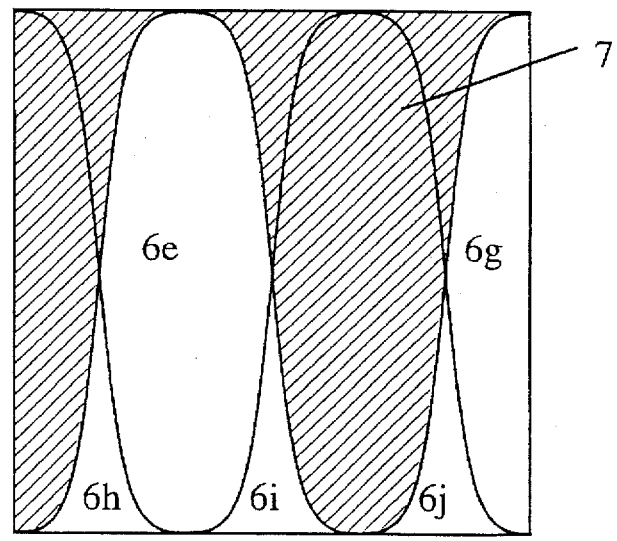

If, for example, the sub-areas 6a,b,c,e,g are opaqe, the other areas are transparent, a mask as shown FIG. 4 can be generated. Within the same area as before, a different mask (FIG. 5) can be generated, by simply switching the sub-areas 6a,b,c,d,f to the opaque state (the other sub-areas are transparent).

By means of the invention, arbitrary changeable binary masks can be configured by a few sub-areas. The geometrical patterns can be generated with high precision, and without spatial quantisation. In connection with the astigmatic projection, nearly arbitrary fringe-like light patterns can be generated without spatial quantisation and without quantisation of the illumination.

In general, groups of sub-areas are transparent at the same time or opaque at the same time. Hence, the number of control elements such as electrical lines and electrodes can be small, compared to the number of sub-areas. This facilitates the production and control of the mask. In the example of FIGS: 4, 5, the sub-areas 6d,f can be controlled by a common electrode, as well as the sub-areas 6e,g. Furthermore, some sub-areas display the same transparency for all light patterns $I_k$. This is the case in the example of FIGS. 4,5: sub-areas 6a,b,c are always opaque and can be either controlled by one single electrode or even remain uncontrolled if properly covered by an opaque material.

By joint control of all sub-areas the whole mask can be made transparent or opaque.

Figure 6:
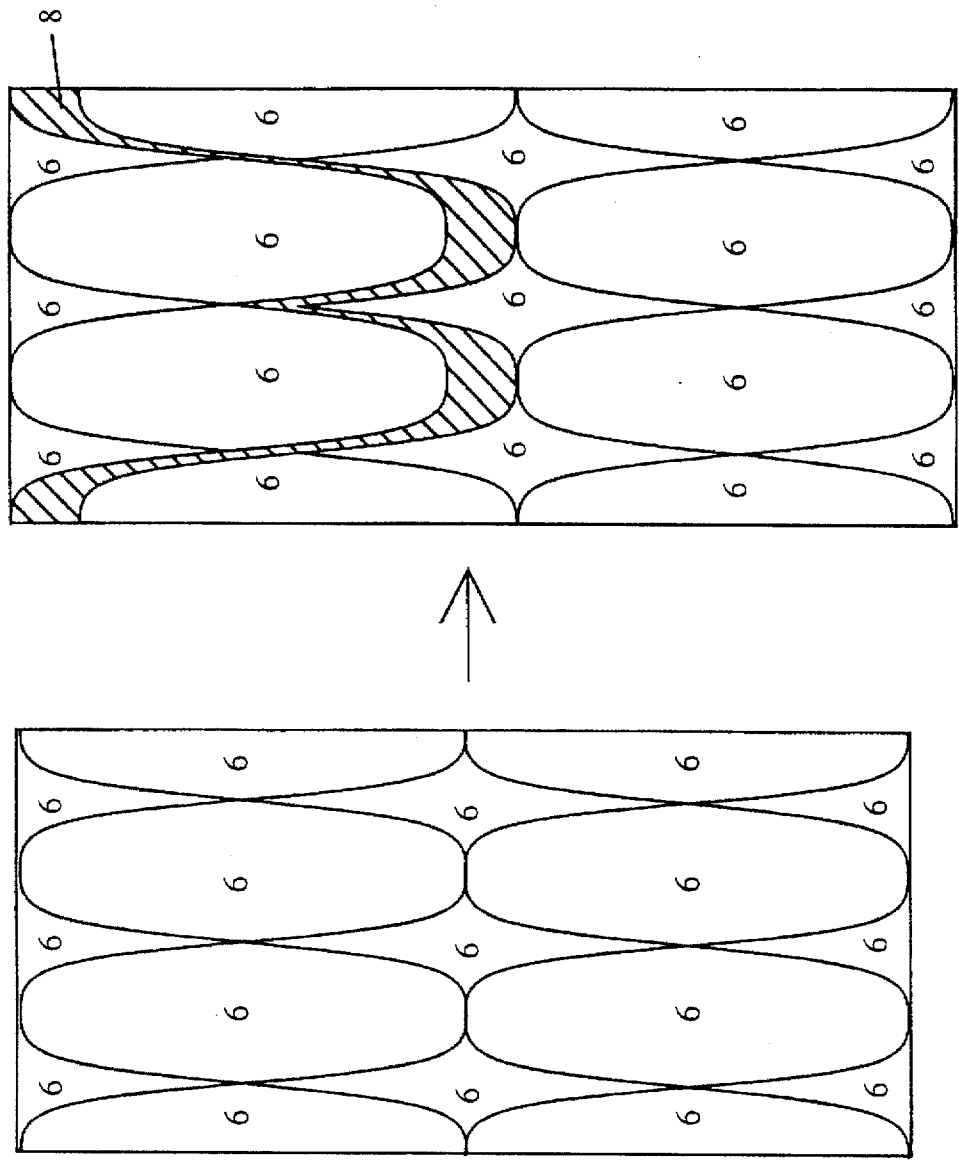
FIG. 6 displays one example of modification of the sub-areas. The modification does not affect the light pattern but enables easier contacting of the sub-areas.

Complicated masks with many sub-areas will generally contain some sub-areas that are separated from the edge of the mask, by other sub-areas ("islands"). To avoid supplying the islands with contacts that run across other sub-areas, the sub-areas can be pulled apart in x-direction, such as shown in FIG. 6. The appearing gaps have to be covered by non transparent material. The electric lines can be located within the gaps. The desired light pattern is not affected by this re-arrangement of the sub-areas.

To avoid too complicated structures on the mask, fine details can be implemented by a non controllable opaque cover, behind which coarse controllable sub-areas are located. The cover can be implemented, for example, by a chromium layer.

A different embodiment uses properly shaped light emitting diodes or gas discharge displays or incandescent lamps. Many more technologies are available for the generation of of proper controllable sub-areas: technologies based on electro-optical effect, Kerr effect, ultra sound modulators.

We claim:

1. An apparatus for the generation of given fringe-like light patterns, comprising a mask, and an astigmatic imaging system for projecting light from said mask onto an object; wherein the mask is assembled from non-stripe shaped sub-areas, and a transparency or a luminance of said sub-areas can be controlled, and said sub-areas are controlled to be bright or dark, in a way that their combination results in a desired sub-mask, the projected image of said sub-mask onto said object displaying the desired fringe-like light-pattern, wherein it is possible to switch over between different given light patterns by other combinations of bright or dark controlled sub-areas, said sub-areas are shaped in a way that the transparent part of the formed sub-mask varies continuously in x-direction, such that a light pattern is formed with continuous variation of brightness, and said sub-areas are shaped in a way that some of said sub-areas are controlled to be bright with two or more of said light patterns.

2. Apparatus for the generation of given fringe-like light patterns, according to claim 1, wherein the sub-areas (6) necessary for the gneration of all sub-masks (7), are allocated on the area of one sub-mask only, by interlacing the sub-areas (6) like a mosaic.

3. Apparatus for the generation of given fringe-like light patterns, according to claim 1, wherein the sub-areas (6) are pulled apart and that the formed gaps (8) are used to locate the electric lines for the brightness control of the sub-areas.

4. Apparatus for the generation of given fringe-like light patterns, according to claim 1, wherein an additional non controllable opaque cover is located on the mask that contributes to form the light-pattern.

5. Apparatus for the generation of given fringe-like light patterns, according to claim 1, wherein liquid crystals are used to control the brightness and
   that a liquid crystal display is used as said mask and
   that said sub-areas are displayed on said liquid crystal display as opaque areas.

6. Apparatus for the generation of given fringe-like light patterns, according to claim 1, wherein suitably shaped light emitting diodes are used as said mask to control the brightness.

7. Apparatus for the generation of given fringe-like light patterns, according to claim 1, wherein liquid crystals are used to control the brightness and
   that a liquid crystal display is used as said mask and
   that the pixels of said liquid crystal displays are structured and manufactured in the shape of said sub-areas.

8. An apparatus for generating a set of N given fringe like intensity distributions $I_k(y)$, wherein I denotes a local intensity depending only on the y-direction, while in the x-direction the intensity is constant, and k is an integer between 1 and N denoting a number of the given individual intensity pattern, comprising:

a mask assembled from non-stripe shaped subareas, a transparency or a luminance of each of said sub-areas being controllable between bright and dark to form a given mask pattern, said sub-areas being constructed by drawing a graph of the N desired functions $I_k(y)$ within one single diagram, the superposition of the different graphs forming a mosaic of sub-areas, the graphs becoming the boundaries of the given sub-areas, said subareas being controlled between bright and dark for the projection of an intensity distribution $I_k(y)$, by switching all sub-areas located under the graph of $I_k(y)$ to the bright state, and an astigmatic imaging system for projecting an astigmatic image of said given mask pattern, said astigmatic imaging system including a cylindrical lens for integrating radiation received from said mask in one spatial direction and converting the given mask pattern of light and dark sub-areas into a fringe-like pattern, the fringe-like pattern projected by said astigmatic imaging system being variable by varying said given mask pattern of light and dark sub-areas of said mask.

9. An apparatus for generating a set of N given fringe like intensity distributions $I_k(y)$ wherein I is a local intensity depending only on the y-direction, while in the x-direction the intensity is constant, and k is an integer from 1 to N denoting a number of the given individual intensity pattern, comprising:

a mask assembled from non-stripe shaped subareas, a transparency or a luminance of each of said sub-areas being controllable between bright and dark to form a given mask pattern, a geometrical form of the sub-areas being shaped in a way that the integral in x-direction of the sub-areas controlled to be in bright state is the function $I_k(y)$; and an astigmatic imaging system for projecting an astigmatic image of said given mask pattern, said astigmatic imaging system including a cylindrical lens for integrating radiation received from said mask in one spatial direction and converting the given mask pattern of light and dark sub-areas into a fringe-like pattern, said fringe-like pattern projected by said astigmatic imaging system being variable by varying said given mask pattern of light and dark sub-areas of said mask.

* * * * *